United States Patent [19]

Nguyen-Tat et al.

[11] 3,859,456

[45] Jan. 7, 1975

[54] SYSTEM FOR ANALYZING AND STORING TELEGRAPH CHARACTERS RECEIVED ON SEVERAL LINES

[75] Inventors: Thang Nguyen-Tat, Jouy-en-Josas; Roger Andre Pain, Vaires; Jean-Claude Herluison, Argenteuil, all of France

[73] Assignee: International Standard Electric Corporation, New York, N.Y.

[22] Filed: Dec. 11, 1973

[21] Appl. No.: 423,870

[30] Foreign Application Priority Data

Dec. 21, 1972 France .............................. 72.45696

[52] U.S. Cl. .............................................. 178/3

[51] Int. Cl. .............................................. H04l 17/00

[58] Field of Search ............ 178/2 R, 3, 26 R, 26 A, 178/DIG. 3; 340/147 G

[56] References Cited

UNITED STATES PATENTS

| | | | |
|---|---|---|---|
| 3,403,383 | 9/1968 | Kienzle et al. | 178/2 R |
| 3,469,021 | 9/1969 | Dahlblom et al. | 178/3 |
| 3,639,682 | 2/1972 | Benmussa et al. | 178/3 |
| 3,662,095 | 5/1972 | Benmussa et al. | 178/3 |
| 3,717,723 | 2/1973 | Jaskulke et al. | 178/3 |

*Primary Examiner*—Thomas A. Robinson
*Attorney, Agent, or Firm*—John T. O'Halloran; Menotti J. Lombardi, Jr.; Alfred C. Hill

[57] ABSTRACT

A character block or logic circuitry is disposed between the line unit receiving telegraph characters on several lines and a central processing unit of a telegraph switching center. The character block reads out the characters stored in the line unit and, during transfer to buffer stores, analyzes the characters and send corresponding signals to the central processing unit. This arrangement reduces the work load on the central processing unit.

9 Claims, 10 Drawing Figures

SYSTEM FOR ANALYZING AND STORING TELEGRAPH CHARACTERS RECEIVED ON SEVERAL LINES

BACKGROUND OF THE INVENTION

The present invention relates to a system for analyzing and storing telegraph characters received on several lines in a telegraph switching center.

The system for analyzing and storing the telegraph characters of the invention can be applied in telegraph message receiving or switching centers, in a telegraph automatic exchange or in any other similar installation.

The transmission of telegraph messages is usually performed by means of signals which can take either of two values called hereafter "0" and "1." Transmission is done character by character. A character always includes a beginning-of-character signal called "start" of value 0, several significant signals or unit elements, of value 0 or 1, and an end-of-character signal called "stop" of value 1. The number of unit elements varies from five to eight according to the alphabet which is used. The unitary time length of the unit element is defined by the adopted transmission speed.

The reception of telegraph signals involves two operations: observation of the line in order to detect, in the course of time, the value of the received signals, and the processing of the data resulting from the line observation, in order to determine the value of each of the unit elements and reconstitute the received characters.

The line observation need not be permanent. The state of the line has just to be observed periodically for a very short period of time. The frequency of observation must take the time-length of the unit elements into account as well as the possible distortion. Moreover, it is possible to compare the result of each observation with that of the previous observation, in order that only the changes from one state to another, or transitions, may be made apparent. At the beginning of a character, there always occurs a transition from state 1 to state 0. Then, the direction of transitions alternates.

The above mentioned characteristics are taken into account in a telegraph signal receiving system described in U.S. Pat. No. 3,662,095. This system comprises, more particularly, a transition detecting and character reconstitution block, called line block, enabling storing in a waiting queue the reconstituted telegraph characters, accompanied by the identify of the lines. A central processing unit then reads these characters in the waiting queue to reconstitute messages, analyze their contents and, more particularly, addresses and their storing in a memory for a subsequent retransmission on the appropriate outgoing lines. This task constitutes heavy work for the central processing unit and it has become advisable to lighten the work of the central processing unit as much as possible.

SUMMARY OF THE INVENTION

An object of the present invention is to lighten the working load of the central processing unit by providing an independent cooperative system to perform the analysis and the storing of the received characters, which are simple repetitive functions.

The telegraph character analyzing and storing system of the present invention is mainly constituted by a set of logic circuits which will be referred to herein after as a "character block." The character block is arranged between one or several line blocks and a central processing unit enabling the switching and the routing of messages received in a telegraph signal switching center.

The character block of the present invention has to read out the telegraph characters stored by the line block in a waiting queue and to store the telegraph characters in buffer stores, to analyze, during the transfer, the different characters in order to detect characters or sequences of significant characters and to transmit corresponding signals to the central processing unit. The character block, therefore, will lighten appreciably the work load of the central processing unit.

A feature of the present invention is to provide a system for analyzing and storing telegraph characters received on several lines comprising: a line unit coupled to the lines, the line unit detecting transitions in the characters and reconstituting the characters received on each of the lines; a reception waiting queue coupled to the line unit, the waiting queue having memory cells each associated with a different one of the lines to store the characters of an associated one of the lines and an address identifying the associated one of the lines; a central processing unit; and a character block coupled between the waiting queue and the central processing unit, the character block including a plurality of line memory cells; a plurality of buffer stores, and a sequential operation control unit coupled to the waiting queue, the line memory cells, the buffer stores and the central processing unit, the control unit taking one of the characters and the associated one of the addresses from the waiting queue, addressing one of the line memory cells in response to the associated one of the addresses, reading into the one of the line memory cells a buffer store address and having access to that one of the buffer stores corresponding to the buffer store address to store therein the one of the characters for use by the central processing unit.

Another feature of the present invention lies in the fact that the direct access memory includes means to provide the address of a free buffer store when the line memory cell read by the character block does not contain any buffer store address.

A further feature of the present invention lies in the fact that the means used to provide the address of a free buffer store include an availability table in which each buffer store is represented by a bit.

Still another feature of the present invention lies in the fact that it includes means to address one of the cells of the availability table, to read in it bit after bit the word which is stored in it then to address the next cell, to read in it bit after bit the word stored in it and so on up to the reading of the first bit characterizing a free buffer store.

Still a further feature of the present invention lies in the fact that it includes means taking action when all the words of the availability table have been read without a bit characterizing a free buffer store being identified to transmit an interrupt request signal to the central processing unit and interrupt the operation of the character block until the central unit, after clearing at least a buffer store and updating the availability table, causes the restarting of the character block operation.

Still another feature of the present invention lies in the fact that it includes means to identify the writing address in the buffer store as being the address of the last cell of a buffer store and that these means enable the storage of the incident character in this cell and take action only to write in the corresponding line memory cell a running writing characteristic address present in the buffer store.

Another feature of the invention lies in the fact that it includes sequential information arranged in each of the line memory cells to follow up the progress of the reception of each received message, a translator to receive an incident telegraph character, the position of the sequential information of the line concerned and to provide a new position of the sequential information and, if necessary, a signal means for transmitting signals towards the central processing unit, and control means, in the character block, arranged so as to take an incident character, to read in the line memory cell corresponding to the line through which it is transmitted the position of the sequential information to provide the translator with the character and the position of the sequential information and obtain as a response the new position of the sequential information and, if necessary, a signal to store in said line memory cell the new position of the sequential information, if necessary, to provide the signal transmitting means with the information including the signal and the identity of the line concerned.

Still another feature of the present invention lies in the fact that the signal transmitting means consist of a storage area arranged as a waiting queue.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

A telegraph message receiving and switching center in which is used the character block forming the subject of the present invention will be first described.

Figure 1:
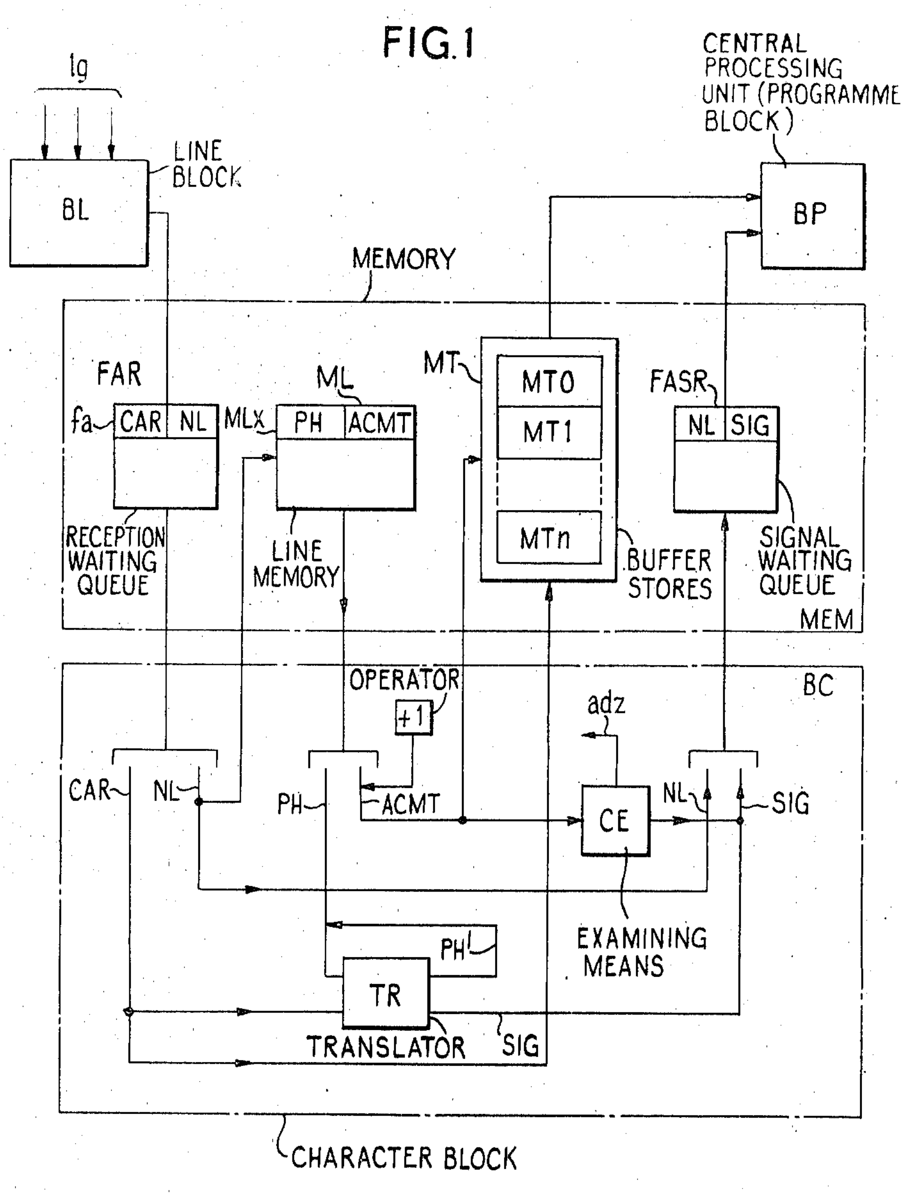
FIG. 1 shows the block diagram of an embodiment of a telegraph message receiving and switching center including the character block in accordance with the principles of the present invention.

The diagram of FIG. 1 represents the essential elements of such a center. They constitute a group of telegraph lines 1*g*, a line block BL, a character block BC, a central processing unit or program block BP and a memory MEM. This memory which can be a ferrite core memory of a conventional type, comprises more particularly a reception waiting queue FAR, a line memory ML, an area MT of buffer store MTO to MT*n* and a signal waiting queue FASR.

The line block BL periodically examines the states of the lines 1*g*. Each change of state or transition gives rise to a particular processing aiming at reconstituting a telegraph character. Each entirely reconstituted character CAR, accompanied by the identity NL of the telegraph line on which it has reached the line block BL, is stored by this block in a memory cell such as *fa* of the reception waiting queue FAR.

The character block BC, when it is available, reads out of this waiting queue FAR a telegraph character CAR and the identity NL of the line concerned. It analyzes the character CAR in order to detect if it belongs to a significant message part as the heading or the sequence of end of message. For that purpose, the character block BC consults the contents of a memory cell ML*x* of the line memory ML. The address of this cell is deduced from the line number NL. In this cell, are stored an indication PH used as sequential information and the address ACMT of a buffer storage cell allocated to the considered line NL.

The character CAR and the position PH of the sequential information are combined to address a translator TR. As a response, translator TR provides a new position of the sequential information PH′ and a possible signal SIG. If the character is, for instance, the last character of the heading, a signal indicating an end of heading is made up by the character block BC. The signal SIG is stored in a memory cell of the signal waiting queue FASR accompanied by the number of the line NL. In other respects, the character block BC stores the character CAR in the cell of one of the buffer stores of the area MT defined by the address ACMT. Simultaneously, the character block BC replaces, in the line memory cell ML*x*, the former position PH of the sequential information by the new position PH′, while through an operator called "+1," it indexes the address ACMT before storing it again in the memory cell MLx.

The character block BC can now read out another character of the waiting queue FAR.

In other respects, examining means CE enables examining the address ACMT. If this address is the last one of a buffer store, means CE also provide a signal SIG which will, more particularly, include the base address of this buffer store and an indication meaning "full buffer store." This signal is stored in the waiting queue FASR, accompanied by the line number NL. Simultaneously through a connection *adz*, means CE cause, during the storing of the address ACMT in the memory cell ML*x*, an inhibition which causes the writing of a null value.

Subsequently, when a character arrives on the same line, the presence of a null address ACMT will be interpreted as an allocation request of a new buffer store, by means not represented on FIG. 1.

The program block BP, when it is available, reads the signals in the waiting queue FASR. The signals resulting from the analysis of the characters determine switching operations concerning the message routing towards outgoing lines. The signals "full buffer store" are used within the scope of these switching operations for routing within the switching center, in one time, characters provided by a buffer store. Thus, the program block BP has no longer to fulfill repetitive tasks requiring much time such as the analysis and the storing of characters one after the other, these tasks being now fulfilled by character block BC. A very significant increase in efficiency results from this.

There will be now described with reference to FIG. 2, an embodiment of character block BC according to the principles of the present invention.

Figure 2:
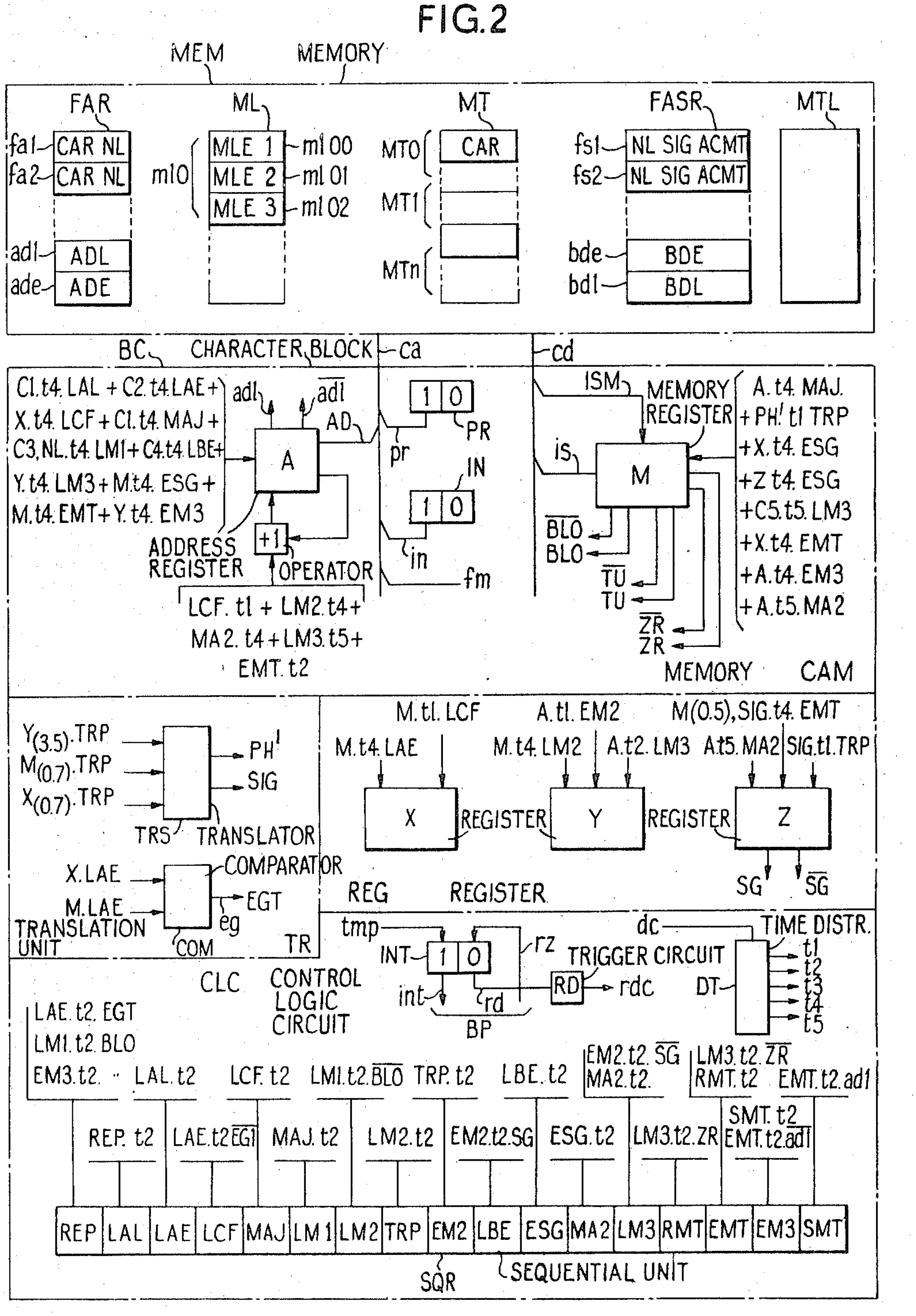
FIG. 2 shows the diagram of a detailed embodiment of the character block of FIG. 1.

The character block BC and the memory MEM of FIG. 1 will be seen in FIG. 2.

The memory MEM is still made up of the reception waiting queue FAR, of the line memory ML, of the buffer storage area MT and of the signal waiting queue FASR. Besides, it includes an availability table of the buffer stores MTL.

The reception waiting queue FAR is constituted by a succession of memory cells such as *fa*1, *fa*2, used each, as previously noted, to store a reconstituted character CAR and the number NL of the line upon which it has been received. Besides, it includes two service cells ade and adl the respective contents of which ADE and ADL indicate the memory cell of the reception waiting queue FAR to be used for the next writing and the cell to be consulted during the next reading operation.

The line memory ML includes store locations such as *ml*0 allocated to the telegraph lines. Each location includes three consecutive memory cells *ml*00, *ml*01 and *ml*02 in which are stored memory words MLE1, MLE2 and MLE3 which will be subsequently described.

The signal waiting queue FASR is constituted by a succession of memory cells such as *fs*1 and *fs*2 used to store a signal SIG, the line number NL and, if necessary, the address ACMT. Moreover, it includes two service cells bde and bdl containing informations BDE and BDL. The item of information BDE indicates the memory cell of the signal waiting queue FASR to be used for the next writing. The item of information BDL indicates the memory cell of FASR to be consulted during the next reading operation.

The buffer storage area MT includes several consecutive locations MTO, MTl,..., MT*n*. Each of these locations is allocated to a telegraph line according to the present needs and availabilities. Each of them is constituted by consecutive addresses provided for receiving each character CAR. To make the addressing easier, the locations such as MTO are constituted by a number of addresses equal to a power of two (64, for instance).

The availability table MTL of the buffer stores is a full condition pattern of the buffer stores of the area MT. Each buffer store is represented in table MTL by a bit. This bit is 0 if the buffer store is available and 1 if the buffer store is full.

In the character block of FIG. 2, there is found a group of circuits having access to the memory CAM, a group of registers REG, the translation unit TR and a group of control logic circuits CLC.

The circuits having access to the memory CAM include various logic circuits making the writing or reading requests and receiving in exchange an item of information indicating that the required operation is performed, an address register A in which is written the address to be selected in the memory MEM and a memory register M in which is written the item of information to be transferred into the memory MEM or in which is written the item of information read in the memory MEM. The circuit for routing the addresses in the register A has been represented by a logic equation which includes here ten terms corresponding to 10 cases when the memory must be addressed. The effective design of this circuit presents no difficulty (combination of gates "AND" and "OR"). The same is true for the circuit provided for writing information to be stored in the register M.

When the character block must read an item of information in the memory MEM, the address is written in register A then a bistable PR is set. It transmits a call signal onto a conductor *pr* of an addressing channel *ca* of the memory MEM, while the address displayed by register A is transmitted onto conductors AD of channel *ca*. The memory MEM effects the required reading operation and provides an item of information on conductors ISM of a data channel *cd*. This item of information is written in register M. When the reading operation is completed, the memory MEM provides a signal of end of operation on a conductor *fm* of the channel *ca*. The bistable PR is then reset, in order to stop the call of memory MEM.

When the character block must store an item of information in the memory MEM, the address is written in register A, the item of information to be stored is written in register M and the bistable PR and a bistable IN are set. They transmit a call signal onto conductor *pr*, and a writing order onto a conductor *in* of addressing channel *ca*. The address is displayed on the conductors AD and the item of information to be stored is displayed on conductors IS of the channel *cd*. When the writing operation is completed, the memory M sends a signal onto conductor *fm*, as for the reading operation. Bistable circuits PR and IN are reset.

The group of registers REG includes three registers X, Y and Z. These registers are auxiliary registers and the function of which is to store temporarily information provided by registers A and M and into which they will be resent in due time.

The translation unit TR includes a translator TRS and a comparator COM.

The translator TRS receives the character CAR read out of a cell of the waiting queue FAR and the position or phase PH of the sequential information stored as previously noted, in a cell of the line memory ML (FIG. 1). The translator TRS provides as a response a new phase PH′, which can be the same as previously and, if necessary, a signal SIG.

The comparator COM receives, on the one hand, the item of information ADE, and, on the other hand, the item of information ADL contained in the service cells of the reception waiting queue FAR. It compares them and, in case of equality, it provides a signal EGT on a conductor *eg*.

The control logic circuits CLC include a time distributor DT, a sequential unit SQR and a bistable INT and a trigger circuit RD.

The time distributor DT provides series of clock impulses *t*1, *t*2, *t*3, *t*4 and *t*5. The total duration of a series of clock impulses can be, for instance, 2 microseconds. The generation of the first impulse of a series is, in a general way, conditioned by the status of the operation in progress which is symbolized by the control *dc*. The other impulses are then automatically generated. The circuits producing these impluses can be, in a known manner, a chain of monostable circuits each of which is triggered by the trailing edge of the impulse generated by the monostable which precedes it.

Figure 6:
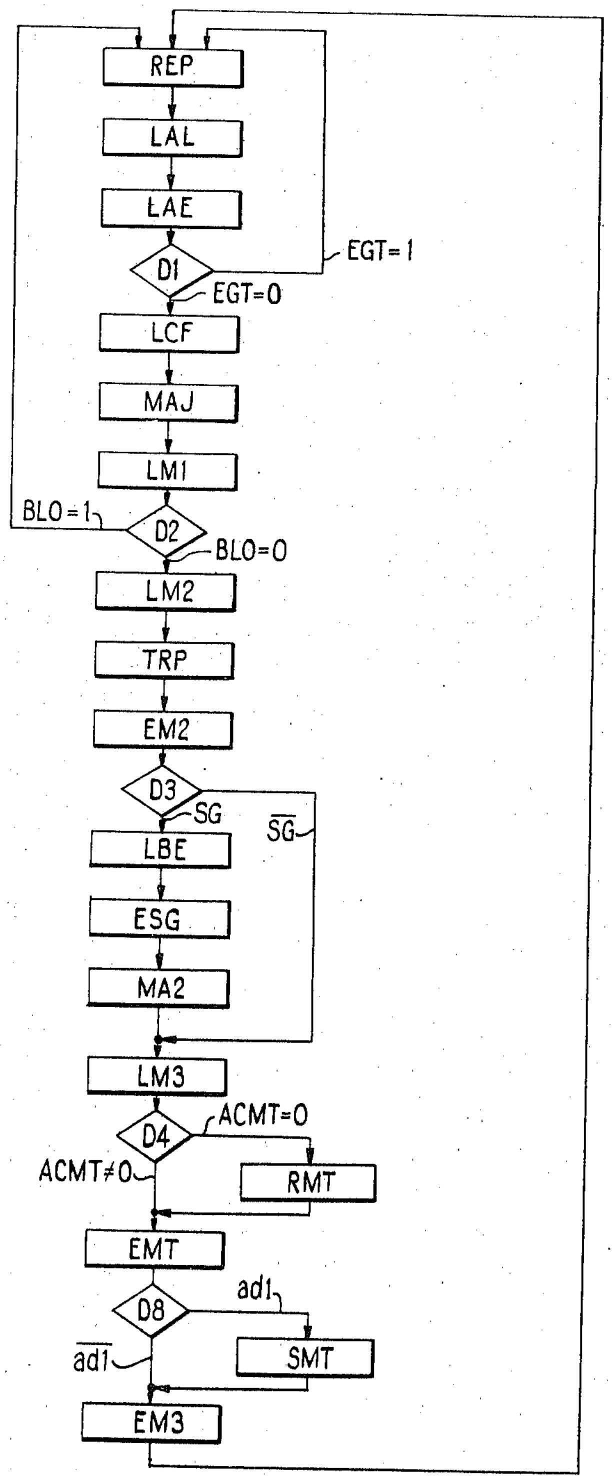
FIG. 6 shows a flow-diagram summarizing the operation of the character block BC of FIG. 2.

The sequential unit SQR can be a chain of bistable circuits operating one after the other in an order defined by the flow chart of FIG. 6. To each bistable corresponds a function during which are executed determined functions.

The sequential unit SQR triggers into each of the thus defined positions under the control of a signal or a combination of signals indicated on FIG. 2, above the considered position. As is used in Boolean algebra, in a combination of signals, a point represents a function "AND" and a sign (+) represents a function "OR."

The bistable INT is set at the reception of a signal on a conductor tmp. This bistable then transmits towards the program block BP, an interrupt request on a conductor int. Bistable INT is reset by a signal provided by the program block BP on a conductor *rz*. Bistable INT then transmits a signal onto a conductor rd towards the trigger circuit RD. As a response, trigger circuit RD delivers a signal on a conductor *rdc*. This signal gives rise to a trigger impulse *dc* for the time distributor DT.

The memory words MLE1, MLE2 and MLE3 stored in the line memory ML will be now described with reference to FIGS. 3, 4 and 5.

Figure 3:
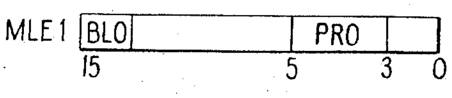
FIGS. 3, 4 and 5 show examples of the composition of memory words used in the system of the present invention.

The line word MLE1 represented on FIG. 3 is written by the program block BP. In the chosen example, this word includes 16 binary elements or bits a few ones of which only are used within the scope of the present invention and, more particularly, the element of rank 15, BLO, and the elements of rank 3, 4 and 5 called PRO.

Accordingly since the bit BLO is 1 or 0, the line is inhibited or not. The bits PRO define the number of the analysis procedure to be used.

Figure 4:
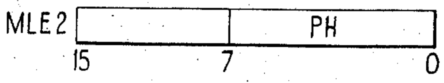

The line word MLE2 represented on FIG. 4 is mainly constituted by a fraction of a word PH. This part of a word constitutes sequential information. It provides the phase number PH previously mentioned.

Figure 5:
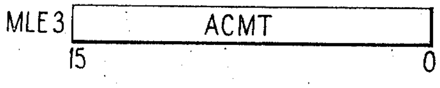

The line word MLE3 represented on FIG. 5 provides the running address for storing the characters in a buffer store. This address is constituted by a part (the most significant bits) giving the initial address of a buffer store of the area MT and a part (the six less significant bits) defining a memory cell of this buffer store.

The detailed operation of the character block BC of FIG. 2 will now be described with reference to the flow chart of FIG. 6. Each rectangle of the flow chart of FIG. 6 corresponds to a function of the character block BC characterized by a position of the sequential unit SQR. The arrows connecting these rectangles indicate the chain of the different functions.

Figure 7:
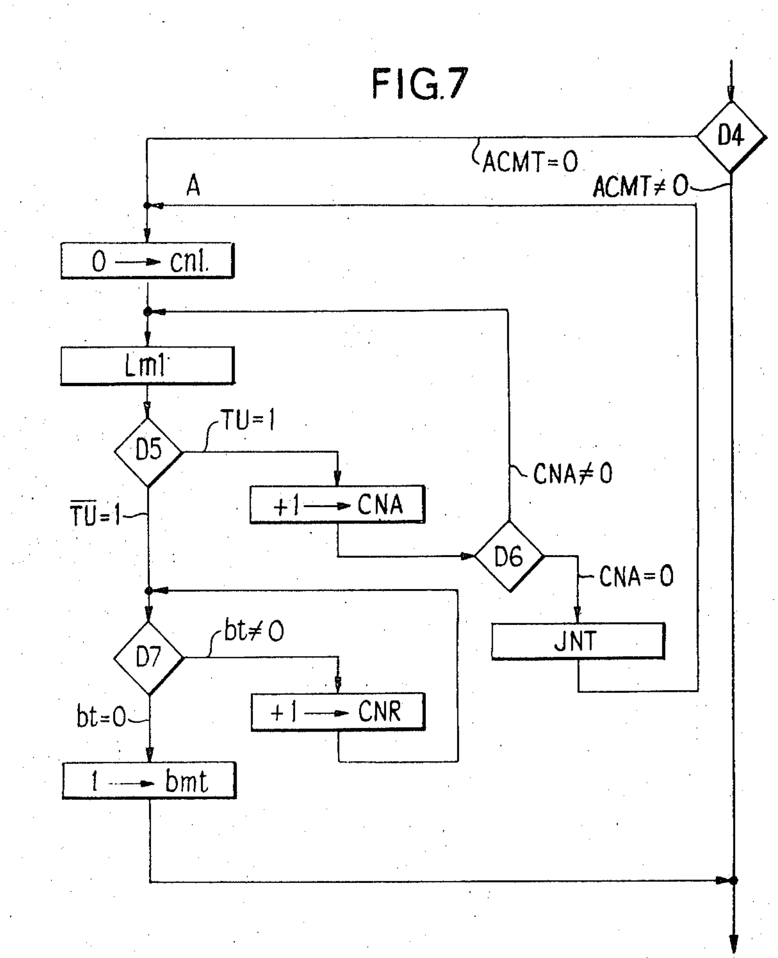
FIG. 7 shows a detailed flow-diagram indicating the operation of the character block BC to carry out the function RMT of the flow-diagram of FIG. 6.

It can be considered that the diagram of FIG. 2 and flow diagrams of FIGS. 6 and 7 correspond to the detailed circuit diagram of the character block BC. Indeed, it is easy to establish, from this diagram and these flow diagrams, a list indicating, for each circuit element, the operations in which they take action as data transmitters; a list indicating for each circuit element operations in which they take action as data receivers; a list of the operators necessary to execute the provided operations. In other respects, these operations are clearly defined (sources of data, types of operations, data receivers) and are all the same well known in technics (loading, unloading of registers, incrementation, decrementation of a binary number, sums and products of data according to Boolean algebra, etc.) and the means enabling performing them. Consequently, one may conclude that these flow diagrams and this diagram constitute a particular representation mode of detailed logic circuits. They offer the advantage of authorizing a clear description of complicated logic equipment.

Initially, it will be supposed that the character block BC is in rest condition and, hence, the sequential unit SQR is in a position REP.

A clock, not represented, sends to the time distributor DT a trigger impulse *dc*. The distributor DT produces afterwards a series of clock impulses *t*1, *t*2, *t*3, *t*4 and *t*5.

The following operations, concerning the seizure of a character in a waiting queue when the character is analyzed and stored in a buffer store, will be controlled by these clock impulses, and, to be more precise, the reader will be referred to each of them by mentioning simultaneously the position of the sequential unit (REP.*t*1, REP.*t*2, etc.).

The impulse REP.*t1* through means not represented to simplify the figure, resets all the circuits with the exception of the bistable REP of the sequential unit SQR.

The impulse REP.*t*2 steps the sequential unit SQR to the position LAL (writing of 0 in the bistable REP and of 1 in the bistable LAL). It will be subsequently noted that the sequential unit is always moving forward under the effect of an impulse *t*2.

In a general way and to simplify FIG. 2, only the signals for controlling the setting have been represented for each of the bistable circuits constituting the sequential unit SQR. It is well understood that each signal also controls the resetting of the bistable previously in state 1.

The impulse LAL.*t*3 is not used. In a general way, the impulse *t*3, which is the first one of each function, merely enables introducing a delay for preparing the circuits. Its function is not effective and it will be no longer mentioned.

The impulse LAL.t4 controls the transfer of a constant Cl into the address register A, which is noted on FIG. 2 by an input C1.*t*4.LAL of the register A. The constant C1 is the address of the service cell *adl* of the waiting queue FAR.

The impulse LAL.*t*5 sets the bistable PR of the circuit CAM. Bistable PR then generates a call signal on the conductor pr of the addressing channel *ca*, connected to the memory MEM. The absence of any signal on the conductor *in* indicates that the character block BC requests a reading. At this very instant, the item of information written in register A is displayed on the conductors AD of the channel *ca* to identify the address to be read.

To simplify the diagram of FIG. 2, there has been deliberately omitted any mention of the operation conditions of the bistable circuits PR and IN, these conditions resulting clearly from the description.

The reading operation is effected, as soon as the memory MEM is available, and the read item of information appears on the conductors ISM of the data channel *cd*. It is written on register M.

The memory M, together with the read item of information, provides a signal on the conductor *fm*. This signal is used to cause a new triggering of the time distributor DT (occurence of a triggering impulse *dc*). As a response, the distributor DT consequently starts a new cycle and first provides an impulse *t*1. The operation of the character block BC is thus synchronized with that of the memory MEM, the end of the operation requested of the memory MEM enabling the following operations to be executed, by retriggering the time distributor.

The impulse LAL.$t1$ resets bistable PR, which stops the call of the memory MEM.

The impulse LAL.$t2$ controls the switching of the sequential unit SQR into position LAE. Register M then contains the item of information ADL read in the cell *ad*1. This item of information is the address of the memory cell of the waiting queue FAR containing the former telegraph character stored by the line block.

As the sequential unit SQR is in a position LAE, the impulse LAE.t4 controls the transfer of the contents of register M into the auxiliary register X (input M.$t4$.LAE of register X). The impulse LAE.$t4$ also controls the transfer of a constant C2 into the address register A (C2.$t4$.LAE). The constant C2, which in register A replaces the constant C1, is the address of the service cell ade of the waiting queue FAR.

The impulse LAE.$t5$ sets bistable PR of circuit CAM. Bistable PR then provides a call signal towards the memory MEM. At this very moment, the item of information written on the register A is displayed on the conductors AD of channel *ca* to identify the address to be read.

The reading operation is effected, as soon as the memory MEM is available, and the read item of information, ADE, appears on the conductors ISM of data channel *cd*. It is written into the register M.

The memory M, together with the read item of information provides a signal on the conductor *fm*. This signal is used to create a new impulse *dc* for tirggering the distributor DT. As a response, distributor DT starts a new cycle and first provides an impulse $t1$.

The impulse LAE.$t1$ resets bistable PR, which stops the call of the memory MEM.

During that time, the comparator COM receives the contents of the register Y (input X.LAE), i.e., the address ADL, and the contents of the register M (input M.LAE), i.e., the address ADE.

The continuation of the operation depends upon the output signal EGT provided on the conductor *eg* by the comparator COM. This signal is at the logic level 1 if no reconstituted character is stored in the waiting queue FAR, the memory cell to be used for the next writing being also the memory cell to be consulted during the reading operation. In the contrary case, the signal EGT is at the logic level 0, if there is at least one reconstituted character stored in the waiting queue FAR.

This alternative is illustrated on the flow chart of FIG. 6 by the lozenge D1.

The first case (EGT = 1) will be first studied for it is simple. The next impulse (LAE.$t2$) controls the return of the sequential unit SQR into the position REP. This return is represented on the flow chart of FIG. 6 by the connection called EGT = 1 between the lozenge D1 and the rectangle REP. On FIG. 2, it is symbolized by the condition called LAE.$t2$.EGT provided at an input of the bistable REP of the sequential unit SQR. The operation of the character block BC then continues as previously described. Practically, the impulses REP.$t4$ and REP.$t5$ are not used. Then, the distributor DT is retriggered only after a certain delay. This enables the character block BC not to resume its operation before a reconstituted character is stored in the waiting queue.

In the absence of the condition EGT, or rather in the presence of the complementary condition $\overline{EGT}$, the impulse LAE.$t2$.$\overline{EGT}$ controls the switching of the sequential unit SQR into the position LCF (connection EGT = 0 of the flow chart of FIG. 6).

The impulse LCF.$t4$ controls the transfer of the contents of the register X, ADL, into the register A (X.$t4$.LCF). The impulse LCF.$t5$ controls the setting of the bistable PR. In the way previously described, the contents of the memory cell of the waiting queve FAR designated by the address ADL, *fal*, for instance, is transferred into the register M. A triggering impulse *dc* is provided after the signal *fm*.

The impulse LCF.$t1$ then controls the resetting of the bistable PR and, on the one hand, the transfer of the contents of the register M into the register X (input M.$t1$.LCF of register X) and, on the other hand, the increase of the contents of the register A by one unit (input LCF.$t1$ of an operator "+1" associated with the register A).

The auxiliary register X now contains the telegraph character CAR accompanied by the number NL of a line upon which it has been received and which was previously stored in the memory cell *fa*1 of the waiting queue FAR. The item of information contained in the address register A is the address of the memory cell disposed immediately after the cell which has just been read, consequently, the address of the cell *fa*2 in the chosen example.

The impulse LCF.$t2$ controls the switching of the sequential unit SQR into the position MAJ. In this position, the updating operations of the service cell ADL of the waiting queue FAR will be performed.

The impulse MAJ.$t4$ controls the transfer of the contents of the register A into Register M (A.$t4$.MAJ) and the insertion of the constant C1 and the address of the service cell adl into the register A (C1.$t4$.MAJ).

The impulse MAJ.$t5$ controls the setting of bistable PR and of bistable IN. Bistable IN then provides a signal on the conductor *in* in order to indicate to the memory that the character block calls it for a writing operation.

The writing is then effected. It transfers the contents of register M, i.e. the address of the memory cell *fa*2 which becomes the new indication ADL, into the memory cell *adl*. The signal of end of operation provided by the memory, as for the reading operation, then controls the triggering of the time distributor DT which provides an impulse $t1$. The latter resets the bistable PR, in order to stop the call of the memory. The bistable IN is also reset.

The impulse MAJ.$t2$ controls the switching of the sequential unit SQR into position LM1. In this position, character block BC will read the line word MLE1 defining, as previously noted, the main characteristics of the telegraph line concerned.

The impulse LM1.$t4$ controls the addition of a constant $C_3$ to the line number NL, the register A being provided with the sum. Practically for 64 lines, for instance, the number NL is defined by six bits per word out of 16 bits, the other bits of which are zero. In the same way, the constant $C_3$ is defined by eight bits the ranks of which are different from these of the number NL in a word of 16 bits. The addition is then obtained by a simple juxtaposition of the bits during their transfer into the register A ($C_3$, N1.$t4$.LM1). The two less significant bits of this address are null. The constant $C_3$ is the address of the first memory cell of the line memory ML in the memory MEM. The register A now contains the address of the first of the three memory cells of the memory location allocated to the considered telegraph line. It will be supposed that this location is the location *ml*0. The register A then contains the address of the memory cell *ml*00.

The impulse LM1.*t*5 controls the setting of bistable PR to call memory MEM.

The reading operation is effected, as soon as the memory MEM is available, and the read item of information, the word MLE1, appears on the conductors ISM of the data channel *cd*. It is written into the register M.

The memory M, with read information, provides a signal on the conductor *fm*. This signal is used to create a new impulse *dc* to trigger the distributor DT. As a response, distributor DT starts a new cycle and first provides an impulse *t*1.

The impulse LM1.*t*1 controls the resetting of bistable PR.

The subsequent operation depends upon the value of the bit of rank 15, BLO, of the word MLE1. This alternative is represented on the flow diagram of FIG. 6 by the lozenge D2.

If this bit is 1, the telegraph line is inhibited. A signal BLO is then provided by register M. The impulse LM1.*t*2, in the case of the existence of signal BLO, controls the return of the sequential unit into the position REP. This is illustrated on the flow diagram of FIG. 6 by a connection called BLO = 1 between the lozenge D2 and the rectangle REP. It is symbolized on FIG. 2 by a condition LM1.*t*2.BLO controlling the bistable REP. In this case, the character CAR read out of the waiting queue FAR is refused.

It bit BLO is zero, a signal $\overline{BLO}$ is provided. In the presence of this signal, the impulse LM1.*t*2.BLO controls the switching of the sequential unit SQR into a position LM2. This switching is illustrated on the flow diagram of FIG. 6 by the connection BLO = 0.

The impulse LM2.*t*4 controls the addition of one unit (input LM2.*t*4 of the operator "+1" associated with the register A) to the contents of register A. This register now contains the address of the line memory cell *ml*01. This impulse also controls the transfer of the contents of the register M, consequently, of the word MLE1, into the register Y (input M.*t*4.LM2). The character block, according to the previously described way, now reads the contents of the memory cell *ml*01, i.e., the line word MLE2, which is transferred into the register M. The signal of end of operation provided by the memory controls the trigger of the time distributor DT which provides an unused impulse *t*1 then an impulse *t*2.

The impulse LM2.*t*2 controls the switching of the sequential unit SQR into the position TRP. At this time, the register M contains the memory word MLE2 and, particularly, the word part the present value PH of which gives the phase of the analysis sequential information. The character block thanks to, more particularly, this sequential information is in a position to note if the character read out of the waiting queue belongs to the text of the message or if one of so-called significant characters belonging, for instance, to the heading or to the end sequence, is concerned. The sequential information is a sort of counter which takes a determined position whenever a significant character is received. Thus, for instance, when the messages begin by the sequence ZCZC, the sequential information will be in position 1 after the character block has identified the first Z. If the second received character is a C, the sequential information will change into position 2. In the contrary case, it changes, for instance, into position 5. After reception of the third character, a Z, the sequential information, previously in position 2, changes into position 3. If it was in position 5, it can be decided that the second character was an erroneous character and the two characters previously identified are not considered in this case, the sequential information changing into position 1.

When the messages begin by a different sequence, the principle of the analysis is identical but, as the sequence to be identified are different, one provides to use an additional item of information defining the used message composition principle, or procedure.

Practically, in addition to the analysis sequential information stored in a memory word, a translator is used. This translator receives the incident character and the position of the sequential information. The translator provides the new position which must take the sequential information and, if necessary, a particular signal such as "message beginning" after the reading in the waiting queue of the second C of sequence ZCZC, or "end of heading," or "end of message."

This translator can take the form of a store location in which each cell addressed with the incident character and the present position of the sequential information contains the new position of the sequential information. To simplify the figure, this translator has been represented by the translator TRS contained in the character block BC.

Since the sequential unit SQR is in position TRP, the eight less significant bits of word MLE2 written into the register M are transferred to the translator TRS ($M_{(0-7)}$.TRP). It has been noted that these bits define the present phase of the analysis sequential information. In the same way, the eight bits defining the character written into the register X are transferred to the translator TRS ($X_{(0-7)}$.TRP) and the three bits defining the procedure in the word MLE1 now written in register Y are transferred to the translator TRS ($Y_{(3-5)}$.TRP). The translator provides as a response the new value PH' of the analysis sequential information and, if necessary, a signal SIG.

The impulse TRp.*t*4 is not used.

The impulse TRP.*t*5 supplies a trigger impulse *dc* to the distributor DT.

The impulse TRP.*t*1 controls the transfer of the new value PH' of the analysis sequential information into register M (PH'.*t*1.TRP) and the signal SIG into the auxiliary register Z (SIG.*t*1.TRP).

The phase PH' replaces, in register M, the former phase PH.

The impulse TRP.*t*2 controls the change of the sequential unit SQR into the position EM2. In this position of the sequential unit, the character block writes the memory word MLE2, now contained in the register M, in the line memory cell *m*101 the address of which is still written in the address register A. The writing is made in the way previously described.

The end-of-operation signal provided by the memory gives rise to a trigger impulse *dc* for the distributor DT which first provides an impulse t1.

The impulse EM2.*t*1 controls the transfer of the contents of register A, i.e., the address of the line memory cell m101, into register Y (A.*t*1.EM2).

It has been previously supposed (in TRP) that the translator TRS provides a signal SIG. This signal is written in *t*1.TRP in the register Z. This register transmits as a response a signal SG. When the translator TRS delivers no signal, the register Z receives on its input SIG.*t*1.TRP a null item of information. It provides as a response a signal $\overline{SG}$.

The subsequent operation depends upon the signal provided by the register Z. This alternative is illustrated on the flow diagram of FIG. 6 by a lozenge $D_3$. The operation of the character block BC will be described when the translator TRS delivers a signal SIG and, consequently, the register Z provides a signal SG. In the contrary case, when the register Z provides a signal $\overline{SG}$, the following operations will not be effected, the sequential unit SQR changing directly into the position LM3 (EM2.*t*2.$\overline{SG}$).

It is supposed that the character CAR read out of the waiting queue is a C following the sequence ZCZ. The translator TRS has provided a "beginning of message" signal SIG.

In the presence of the signal SG, the impulse EM2.*t*2 controls the change of the sequential information into the position LBE. The character block now reads the service cell bde of the signal waiting queue FASR according to the process previously described. The impulse LBE.*t*4 controls the transfer of a constant C4, defining the address of this service cell into the address register A (C4.*t*4.LBE). The reading operation is then effected, the item of information BDE contained in service cell *bde* is transferred into register M. A trigger impulse *dc* is provided. The impulse LBE.*t*1 controls the resetting of bistable PR.

The impulse LBE.*t*2 controls the change of the sequential unit SQR into the position ESG. The character block then stores, in the memory cell of the waiting queue FASR defined by the item of information BDE, the signal SIG and the line number NL now written in the register Z and X. It is supposed that this cell is the memory cell *fs*1. For this purpose, the address of the cell *fs*1 is transferred from register M into register A (M.*t*4.ESG), the information SIG and NL are transferred from register Z and register Y into register M (Z.*t*4.ESG + Y.*t*4.ESG). The writing operation occurs in the way previously described.

A trigger impulse *dc* is transmitted to the distributor DT which transmits an impulse *t*1.

The impulse ESG.*t*1 controls the resetting of bistable circuits PR and IN of circuit CAM.

The impulse ESG.*t*2 controls the change of the sequential unit SQR into the position MA2. The character block BC will now update the contents BDE of the memory cell *bde*.

The impulse MA2.*t*4 controls the addition of one unit to the contents of register A (input MA2.*t*4 of the operator "+1" associated with register A).

The impulse MA2.*t*5 controls, on the one hand, the setting of bistable circuits PR and IN of the circuit CAM, and, on the other hand, the transfer of the contents of register A (the address of the memory cell *fs*2 of the waiting queue FASR) into the register M (A.*t*5-.MA2) and the safeguard of this address in register Z (A.*t*5.MA2), then the insertion into register A of the constant C4. The writing operation is effected. It transfers the contents of register M, i.e., the address of the memory cell *fs*2 which becomes the new indication BDE in the memory cell *bde*. At the end of the writing operation, a trigger impulse *dc* is applied to the distributor DT which transmits an impulse *t*1.

The impulse MA2.*t*1 controls the resetting of bistable circuits PR and IN of circuit CAM.

The impulse MA2.*t*2 controls the change of the sequential unit SQR into the position LM3.

The impulse LM3.*t*4 controls the transfer of the contents of register Y, i.e., of the address of the line memory cell *ml*01 safeguarded in *t*1.EM2, into register A (Y.*t*4.LM3). The contents of this register are then increased by one unit (input LM3.*t*5 of the operator "+1" associated with register A). The contents of the register A thus become the address of the following memory cell, *ml*02.

The impulse LM3.*t*5 also controls the setting of bistable PR of the circuit CAM. At this time, the item of information written in register A is displayed on conductors AD.

The reading operation is effected and the read item of information, i.e., MLE3, is written into the register M. This word contains the running writing address in the buffer store ACMT.

A trigger impulse *dc* is applied to the distributor DT which first delivers an impulse *t*1.

The impulse LM3.*t*1 controls the resetting of the bistable PR of circuit CAM.

The subsequent operation depends upon the value of the address ACMT contained in the word MLE3. Indeed, if the address ACMT is equal to zero, no buffer store is allocated to the considered line. If a store is allocated to the considered line, the address ACMT is different from zero. This alternative is illustrated on the flow chart of FIG. 6 by a lozenge D4. This lozenge is connected to a rectangle RMT through a connection ACMT = 0. The rectangle RMT and the corresponding distable of the sequential unit SQR symbolize a sequence of operations effected by the character block BC when the address ACMT contained in the word MLE3 is null.

The subsequent operation of the character block BC will be first described by considering that the address ACMT is different from zero (ACMT $\neq$ 0). In this case, register M which contains the address ACMT does not provide any signal ZR but does provide its complement $\overline{ZR}$.

The impulse LM3.*t*2 controls the change of the sequential unit SQR into the position EMT (LM3.*t*2.$\overline{ZR}$). Simultaneously, it transfers the address *ml*02 of register A into the register Y (A.*t*2.LM3).

The impulse EMT.*t*4 controls the transfer into the register A of the address ACMT which is the address of a cell of the buffer store, MTO, for instance, allocated to the considered line (input M.*t*4.EMT of register A). This impulse also controls the transfer of the telegraph character CAR from register X into the register M (X.*t*4. EMT). This impulse finally controls, as a prevision, the transfer into the register Z of the six less significant bits of the address ACMT giving the number of the cell of the buffer store MTO to be used, and a "full buffer store" signal ($M_{(0-5)}$, SIG.*t*4.EMT).

The impulse EMT.*t*5 controls the setting of the bistable circuits PR and IN of the circuits CAM.

The writing operation is then effected. It transfers the contents of register M, i.e., the character CAR into a cell of the buffer store MTO. The signal of end of operation provided by the memory, as for a reading operation, then controls the trigger of the time distributor DT which delivers an impulse *t*1. The latter resets bistable PR in order to stop the call of the memory. Bistable IN is also set.

The impulse EMT.*t*2 controls, according to the process previously mentioned, the increase of one unit of address ACMT contained in register A (input EMT.t2 of the operator "+1" associated with register A). As a response, register A provides a signal depending upon the six less significant bits of the address ACMT defining the number of the cell of the buffer store MTO. Indeed, if this number is zero, the character block BC has just stored the character CAR in the last cell of the buffer store MTO. This buffer store is consequently full. The register A then provides a signal *adl.* If the buffer store MTO is not full yet, the number of the storage cell contained in the address ACMT is different from zero. Register A provides no signal *adl* but does provide its complement $\overline{adl}$. This alternative if represented on the flow chart of FIG. 6 by a lozenge D8. This lozenge is connected to a rectangle SMT by a connection adl. The rectange SMT and the corresponding bistable of the sequential unit SQR symbolize a sequence of operations effected by the character block BC when the buffer store MTO is full.

The subsequent operation of the character blocks will be first described by considering that the buffer store MTO is not full (path $\overline{adl}$ of the flow chart of FIG. 6).

The impulse EMT.*t*2 controls the change of the sequential unit SQR into the position EM3.

The impulse EM3.*t*4 controls the transfer of the contents of register A into the register M (A.*t*4.EM3) and the transfer of the contents of register Y, the address of the memory cell *ml*02, into register A (Y.*t*4.EM3).

In the way previously described, the character block writes, in the memory cell *ml*02, the new running writing address in the buffer store.

The impulse EM3.*t*2 controls the change of the sequential unit SQR into the position REP and the character block is ready for a new processing cycle similar to the one which has just been described.

Thus, the character block has read out a character reconstituted and stored in the waiting queue and has analyzed this character. The analysis has resulted in the evolution of the line sequential unit and has given rise to the storing of a signal ("beginning of message" according to the considered example). Then, the character has been stored in the buffer store allocated to the line.

It has been noted that when no buffer store is allocated to the considered telegraph line, the address ACMT contained in the memory word MLE3 is null and the character block BC proceeds to the particular processing which has been called RMT.

Figure 8:
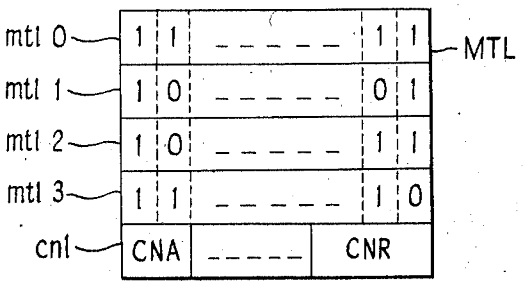
FIG. 8 shows an embodiment of the pattern MTL of FIG. 2.

The operation of the character block BC will be now described with reference to FIGS. 7, 8 and 9, the sequential unit SQR being in a position RMT. The character block will effect a sequence of operations with a view to allocating to the line a buffer store to store the received character. These different operations need, practically, several positions of the sequential unit SQR. Indeed the character block will proceed to reading and writing operations in memory. However, as such operations have been widely detailed in the preceeding description and to simplify FIG. 2, the different positions of the sequential unit SQR have been represented by the unique position RMT.

It has been previously noted that the storage location MTL of the memory MEM was a full condition pattern of the buffer stores of the area MT. It is supposed that the number of these buffer stores is 64. In this case, the pattern MTL, as shows FIG. 8, includes four memory cells *mt*10 to *mt*13. In each of these cells are stored 16 bits. Each of these 16 bits is allocated to a buffer store and is 0 if the buffer store is free and is 1 if the buffer store is full.

The pattern MTL also includes a service cell cnl the contents of which are made up of two informations CNA and CNR. The item of information CNA includes two bits. These two bits designate one of the four cells *mt*10 to *mt*13. Thus, CNA = 00 designates the cell *mt*10 and CNA = 11 designates the cell *mt*13. The item of information CNR includes four bits. These four bits designate one of the 16 bits contained in the memory cell the address of which is given by the item of information CNA.

The sequence of the different operations effected by the character block BC is consequently resumed when the impulse RMT.*t*3 appears. This position is symbolized, on the flow chart of FIG. 7, by the output path of the lozenge D4 called ACMT = 0.

In the way previously described, the character block first proceeds to the resetting of the contents of the service cell *cn*1 this operation being called 0 → *cn*1 on the flow chart of FIG. 7. It is a writing operation with a constant address C6 (that of the cell *cn*1), the item of information to be written being null.

The following impulse *t*2 controls the change into the next operation illustrated by the rectangle L*m*1. In this operation, the character block BC reads the contents of the memory cell of the pattern MTL designated by the item of information CNA, i.e., the contents of the cell *mt*10.

It is a reading operation at an address provided by the juxtaposition of a constant C7 (initial address of the table MTL) and two bits of the indication CNA.

The subsequent operation depends upon the word of 16 bits contained in this cell and which is written into register M. If all the bits of this word are 1, all the buffer stores thus, represented are full. The register M provides in this case a signal TU. If the 16 bit word contains at least one zero bit, one of the 16 buffer stores is available and register M then provides the complementary signal $\overline{TU}$. This alternative is illustrated on the flow chart of FIG. 7 by a lozenge D5.

The case when all the bits of this word are 1 (TU = 1) is first considered. The character block BC will in this case proceed to the reading of the next memory cell mt11. For this purpose, in the way previously described, it increases by one unit the indication CNA contained in the memory cell cnl (+1 → CNA). This address is now 01. It is consequently different from zero and the operation of the character block continues through the reading of the thus designated memory cell as it is shown by the output CNA ≠ 0 of lozenge D6 which returns to the operation Lm1 (reading of the contents of the cell *mt*11) then to the lozenge D5 (does at least a free buffer store exist?).

Figure 9:
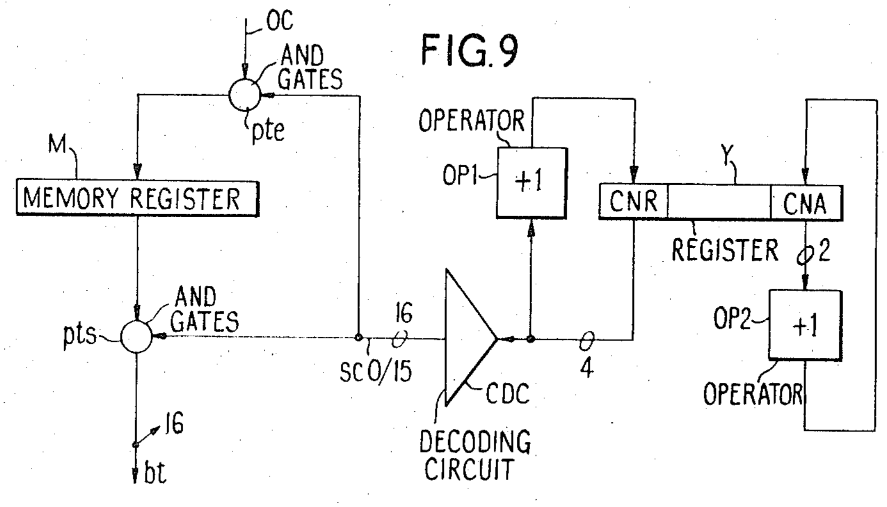
FIG. 9 shows an embodiment of the means used to perform the operations illustrated on the flow-diagram of FIG. 7.

An embodiment of the circuits enabling performing these operations is illustrated by the diagram of FIG. 9.

The diagram of FIG. 9 shows the memory register M and the auxiliary register Y of the diagram of FIG. 2. Besides, a decoding circuit CDC, two operators "+1", OP1 and OP2, and two gates *pte* and *pts* are illustrated.

The contents of the service cell cnl of table MTL are written in register Y and the contents of the memory cell *mt*11 are written in register M.

The operator "+1" OP1 receives the four bits constituting the item of information CNR. It provides the item of information CNR increased by one unit. This new item of information replaces CNR in the register Y.

The operator "+1" OP2 receives the two bits constituting the item of information CNA. It provides the item of information CNA increased by one unit. This new item of information replaces CNA in register Y. It corresponds to the operation called +1 → CNA on FIG. 7.

The decoding circuit CDC receives the four bits of the item of information CNR. According to the value of the item of information CNR, it provides a signal on one of the 16 conductors *sc*0/15, the conductor *sc*1, for instance. These conductors are connected to AND gates collectively represented by the AND gates *pte* controlled by a signal transmitted onto a conductor *oc*. They are also connected to AND gates collectively represented by the AND gates *pts*.

It is supposed that the buffer stores are all full. As previously, the character block BC increases by one unit the address CNA and tests the obtained value. By supposing all the buffer stores full, it leads to the lozenge D6 after the test of the contents of the address *mt*13 (CNA = 11) and a last indexing which brings back the indication CNA to the value 00.

At the decision point D6, path CNA = 0, the character block notes that it has no free buffer store. It proceeds to the operation called JNT. In the operation JNT the interrupt bistable INT of the control logic circuits CLC is set under the control of a signal tmp thus requesting of the program block BP to indicate the buffer stores which it has recently cleared. The character block BC stops its operation.

The program block BP updates again the pattern MTL and by a conductor *rz* provides a resetting impulse of the bistable INT. The resetting of this bistable is transmitted to trigger circuit RD through a conductor *rd*. As a response, circuit RD delivers a trigger impulse onto a conductor *rdc*. This impulse gives rise to a trigger impulse *dc* of the time distributor DT.

The operation of the character block restarts at the break point A.

It is now supposed that the memory cell mt11 contains the bit of rank 1 equal to 0. At the decision point D5, the character block uses the path $\overline{TU}$ = 1. The character block then proceeds to the bit after bit examination of the word stored in this memory cell. The indication CNR the value of which is still 0 is decoded by the circuit CDC and enables one of the gates *pts*, which corresponds to the bit of rank 0 of the register M. If it is supposed that this bit has for value 1 (full buffer store), a signal is provided on the conductor bt (decision point D7) and the character block increases by one unit the word CNR (+1 → CNR) by means of the operator OP1. The bit of rank 1 is then read in the same way and, as it has been supposed that its value is 0, the obtained signal *bt* is null (*bt* = 0). The operation of the character block is then routed towards the operation called 1 → *bmt*. In the first part of this operation (FIG. 9) a signal *oc* is provided at the gates *pte*. One of them, marked by the signal transmitted by the circuit CDC onto one of the conductors *sc*0/15, in this case the gate of rank 1, operates and controls the setting to 1 of the bit which has just been found to be zero. Then, the item of information contained in register M is rewritten in its place in table MTL. Finally, a constant corresponding to the base address of the buffer store area MT is combined with the indications CNA and CNR. The resulting address is written in the register M to take the place of the address ACMT initially found null in LM3.*t*2.

The function which consists in finding a buffer store, RMT, is completed and the operation of the character block continues in the way previously described by the storing in the buffer store of the telegraph character (EMT).

Figure 10:
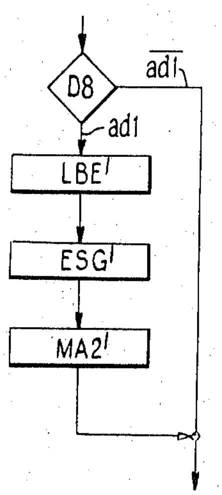
FIG. 10 shows a detailed flow-diagram indicating the operation of the character block BC to carry out the function SMT of the flow-diagram of FIG. 6.

The operation of the character block BC will be now described with reference to FIG. 10, the sequential unit SQR being in the different positions illustrated by the rectangle SMT of the flow chart of FIG. 6. The character block will effect a sequence of operations with a view to writing in the waiting queue FASR a "full buffer store" signal. These different operations need, practically, several positions of the sequential unit SQR. Indeed, the character block will proceed to reading and writing operations in the memory. These positions of the sequential unit SQR are illustrated by the rectangles LBE', ESG' and MA2' of the flow chart of FIG. 10.

In the presence of the signal *adl* provided by register A, the impulse EMT.*t*2 controls the change of the sequential unit into the position LBE'. In this position of the sequential unit, the character block will effect the same operations as those effected when the sequential unit was in the position LBE. So as to not complicate FIG. 2, the inputs of the registers A and M will not be represented in this position. So it will be for the inputs of these registers in the sequential positions ESG' and MA2'. Indeed it will be noted that the operations effected by the character block are identical with the operations effected in the sequential positions ESG and MA2 with one exception.

First of all, since the sequential unit SQR is in position LBE', the character block proceeds to the reading of the address BDE contained in the memory cell *bde* of the waiting queue FASR. This address will be written in the register M.

The sequential unit SQR then changes into the position ESG'. The address BDE is transferred from register M into register A. The line number, NL, written in register X is transferred into register M and the signal "full buffer store" is written in register Z at EMT.*t*4. The character block BC proceeds to the writing of this signal in the cell of the waiting queue FASR designated by the address BDE.

The sequential unit SQR changes into the poisiton MA2'. The character block BC will proceed to the updating of the contents of the memory cell bde. The operation of the character block in this position is identical with the operation previously described (position MA2) except when the impulse MA2'.*t*1 appears. Indeed, the character block BC has just stored a character in the last cell of a buffer store. The new running writing address in the buffer store, ACMT, to be written in the line word MLE3 cannot be obtained by a simple indexing. The character block BC will write in the word MLE3 a characteristic item of information, null, for instance.

The impulse MA2'.*t*1 like the impulse MA2.*t*1 controls the resetting of the bistable circuits PR and IN.

Also, impulse MA2'.t1 controls the writing of a null item of information in register A.

The impulse MA2't2 controls the change of the sequential unit SQR into the position EM3.

The writing function SMT of a "full buffer store" signal is completed. The operation of the character block BC continues in the way previously described by the writing in the memory word MLE3 of the item of information contained in register M.

The central processing unit can take characters stored in the buffer stores and get informed of the signals written in the signal waiting queue by the character block which, also, undertook all the routine manipulations on the characters reconstituted by the line block.

While we have described above the principles of our invention in connection with specific apparatus it is to be clearly understood that this description is made only by way of example and not as a limitation to the scope of our invention as set forth in the objects thereof and in the accompanying claims.

We claim:

1. A system for analyzing and storing telegraph characters received on several lines comprising:
- a line unit coupled to said lines, said line unit detecting transitions in said characters and reconstituting said characters received on each of said lines;
- a reception waiting queue coupled to said line unit, said waiting queue having memory cells each associated with a different one of said lines to store said characters of an associated one of said lines and an address identifying said associated one of said lines;
- a central processing unit; and
- a character block coupled between said waiting queue and said central processing unit, said character block including
  - a plurality of line memory cells;
  - a plurality of buffer stores, and
  - a sequential operation control unit coupled to said waiting queue, said line memory cells, said buffer stores and said central processing unit, said control unit taking one of said characters and the associated one of said addresses from said waiting queue, addressing one of said line memory cells in response to said associated one of said addresses, reading into said one of said line memory cells a buffer store address and having access to that one of said buffer stores corresponding to said buffer store address to store therein said one of said characters for use by said central processing unit.

2. A system according to claim 1, wherein said control unit further includes
- read out means coupled to said line memory cells, and
- memory means to provide the address of a free one of said buffer stores when one of said line memory cells read out by said read out means contains no buffer storage address.

3. A system according to claim 2, wherein said memory means includes
- an availability table in which each of said buffer stores is represented by a bit.

4. A system according to claim 3, wherein said availability table is in the form of a plurality of memory cells, and said control unit further includes
- first means coupled to address one of said plurality of memory cells of said availability table,
- second means coupled to read out of said one of said plurality of memory cells of said availability table the word stored therein,
- third means coupled to said second means to detect the presence or absence of at least one bit indicating a free one of said buffer stores,
- said first, second and third means examining each of said plurality of memory cells in sequence until said third means detects the presence of at least one bit indicating a free one of said buffer stores.

5. A system according to claim 4, wherein said control unit further includes
- fourth means coupled to said third means and said central processing unit to transmit and interrupt request signal to said central processing unit when said third means fail to detect the presence of at least one bit indicating a free one of said buffer stores after all of said plurality of memory cells have been examined, and
- fifth means coupled to said central processing unit to interrupt the operation of said character block in response to an interrupt signal from said central processing unit after receiving said interrupt request signal, said fifth means maintaining said character block in an interrupt state until said central processing unit clears at least one of said buffer stores and updates said availability table.

6. A system according to claim 5, wherein said character block further includes
- sixth means coupled to said buffer stores and said line memory cells to identify a writing address in said buffer stores as the last cell of one of said buffer stores, to enable storing the present one of said characters in said last cell of said one of said buffer stores and to write in the corresponding one of said line memory cells a characteristic item of information rather than said writing address of said last cell of said one of said buffer stores.

7. A system according to claim 1, wherein said characters block further includes
- sequential information stored in each of said line memory cells to enable following the progress of the reception of each received message,
- a translator for receiving an incident one of said characters and for receiving the position of said sequential information for the concerned line, and to provide a new position of said sequential information for the concerned line and to provide, under certain circumstances, a first signal,
- first means coupled to said translator for transmitting said first signal to said central processing unit, and
- second means coupled to said waiting queue, said translator, said first means, and said line memory cells to provide said incident one of said characters in said waiting queue as a first input to said translator and to provide from the corresponding one of said line memory cells the position of said sequential information as a second input to said translator and to receive from said translator said new position to said sequential information and to receive said first signal, said second means storing said new position of said sequential information in the corresponding one of said line memory cells and, to provide under certain circumstances an item of information including said first signal and an address for the concerned line to said first means.

8. A system according to claim 7, wherein said first means includes a storage area disposed in a signal awaiting queue.

9. A system according to claim 7, wherein said character block further includes third means coupled to said buffer stores and said first means, said third means being responsive to storing one of said characters in the last cell of an associated one of said buffer stores to transmit a second signal to said first means, said second signal including a "full storage memory" signal and the address of the concerned line and said associated one of said buffer stores.

* * * * *